United States Patent
Xiong

(10) Patent No.: US 9,418,127 B2
(45) Date of Patent: Aug. 16, 2016

(54) METHOD AND SYSTEM FOR DESIGNING BUSINESS DOMAIN MODEL, DATA WAREHOUSE MODEL AND MAPPING THEREBETWEEN SYNCHRONOUSLY

(71) Applicant: eBaoTech Corporation, Shanghai (CN)

(72) Inventor: Wuzhen Xiong, Shanghai (CN)

(73) Assignee: EBAOTECH CORPORATION, Shanghai (CN)

( * ) Notice: Subject to any disclaimer, the term of this patent is extended or adjusted under 35 U.S.C. 154(b) by 203 days.

(21) Appl. No.: 14/227,526

(22) Filed: Mar. 27, 2014

(65) Prior Publication Data
US 2015/0006467 A1    Jan. 1, 2015

(30) Foreign Application Priority Data
Jun. 28, 2013  (CN) .......................... 2013 1 0271768

(51) Int. Cl.
*G06F 17/30* (2006.01)
(52) U.S. Cl.
CPC ............................... *G06F 17/30563* (2013.01)
(58) Field of Classification Search
CPC combination set(s) only.
See application file for complete search history.

(56) References Cited

U.S. PATENT DOCUMENTS

| | | | | |
|---|---|---|---|---|
| 2008/0256121 A1* | 10/2008 | Liu | ............ | G06F 17/30592 |
| 2009/0249307 A1* | 10/2009 | Yoshida | ............ | G06F 11/3604 717/131 |
| 2009/0271158 A1* | 10/2009 | Yeh | ............ | G06F 17/30592 703/2 |
| 2009/0271345 A1* | 10/2009 | Rich | ............ | G06F 17/30607 706/46 |

FOREIGN PATENT DOCUMENTS

CN    101286151    10/2008

* cited by examiner

*Primary Examiner* — Etienne Leroux
(74) *Attorney, Agent, or Firm* — Merchant & Gould P.C.

(57) ABSTRACT

Method and system for designing a business domain model, a Data Warehouse (DW) model and a mapping therebetween synchronously are provided. The method includes: designing a business domain model based on business logic; designing a DW model based on a structure of a data cube in a DW and designing a mapping between the business domain model and the DW model synchronously; analyzing the business domain model, the DW model and the mapping therebetween based on a predetermined syntax rule; and generating a transactional database corresponding to the business domain model, a DW database corresponding to the DW model, and a mapping between data in the transactional database and in the DW database automatically and synchronously. The system includes a business domain model design unit, a DW model design unit, a mapping design unit, an analysis unit and an automatic generation unit. Mappings are designed more easily, efficiently and accurately.

10 Claims, 2 Drawing Sheets

METHOD AND SYSTEM FOR DESIGNING BUSINESS DOMAIN MODEL, DATA WAREHOUSE MODEL AND MAPPING THEREBETWEEN SYNCHRONOUSLY

CROSS-REFERENCE TO RELATED APPLICATIONS

The present application claims priority to Chinese patent application No. 201310271768.8, filed on Jun. 28, 2013, and entitled "METHOD AND SYSTEM FOR DESIGNING BUSINESS DOMAIN MODEL, DATA WAREHOUSE MODEL AND MAPPING THEREBETWEEN SYNCHRONOUSLY", and the entire disclosure of which is incorporated herein by reference.

FIELD OF THE DISCLOSURE

The present disclosure generally relates to computer technology, and more particularly, to a method and a system for designing a business domain model, a data warehouse model and a mapping therebetween synchronously.

BACKGROUND OF THE DISCLOSURE

At present, database is mainly applied in Online Transaction Processing (OLTP) and Decision Support System (DSS).

OLTP is a kind of operational processing for particular applications of enterprises. Generally, OLTP includes transactional database applications of daily operational tasks in enterprise management, such as timely registration of a new record, and retrieval and modification of a record or a set of records, which generally doesn't need complicated retrieval or analysis. Real-time performance, and security and completion of data are the most concerned parts in OLTP. OLTP is generally used by business staff, so when an OLTP is designed, corresponding transactional databases are generally designed from the view of the business staff. That is, meanings in practical business logics are more considered for the fields in the transactional databases than questions about computer technology.

DSS is a kind of system providing an analysis processing on a basis of a large amount of historical data, for managers' decision analysis. Existing DSS is generally realized based on cooperation of various technologies, such as Data Warehouse (DW), Online Analytical Processing (OLAP), Data Mining (DM), etc. The DW provides a nonvolatile (i e, unmodifiable), subject-oriented and compositive data set which varies with time, to support decisions made by managers. Data is extracted, transformed and loaded from a transactional database to the DW. DW is generally designed from the view of the subject to be analyzed by a skilled person. A subject is generally related to multiple fields in the transactional database.

Due to remarkable differences between a transactional database and a DW, it is very difficult for a skilled person to design a mapping between the transactional database and DW. The business logic contained in the transactional database is transparent in semantic for the DW and the transactional database is developed based on requirements of business staff, however, which may not satisfy development requirements of skilled persons.

In conventional solutions, a mapping from a transactional database to a DW needs to be designed manually, which is complicated and time-consuming, costs high in development and maintenance and has poor transferability and universality.

In conventional solutions, Model Driven Architecture (MDA), such as Eclipse Modeling Framework (EMF), has been developed to design a transactional database model. Besides, conceptual designs for automatically designing a DW model have appeared, such as E/R models proposed by Hüsemann, Lechtenbörger and Vossen in 2000 or proposed by Phipps and Davis in 2002. Nevertheless, these solutions both fail to solve technology problems in designing a mapping from a transactional database to a DW effectively.

More relative information can be found in a Chinese patent publication No. CN101286151A.

SUMMARY

Embodiments of the present disclosure provide a method for designing a mapping between a transactional database and a DW easily, efficiently and accurately.

In one aspect, a method for designing a business domain model, a DW model and a mapping therebetween synchronously is provided, including:

designing a business domain model based on business logic;

designing a DW model based on a structure of a data cube in a DW and designing a mapping between the business domain model and the DW model synchronously;

analyzing the business domain model, the DW model and the mapping therebetween based on a predetermined syntax rule; and generating a transactional database corresponding to the business domain model, a DW database corresponding to the DW model, and a mapping between data in the transactional database and data in the DW database automatically and synchronously.

In some embodiments, the business domain model may include at least one object, each of the at least one object including at least one object element. The DW model may include one fact table and at least one dimension table. The fact table includes metric values and a foreign key which points to the at least one dimension table. Each of the at least one dimension table may include metadata of a dimension in the data cube. Designing a mapping between the business domain model and the DW model may include designing a mapping between metadata in the at least one dimension table and object elements in the at least one object.

In some embodiments, the DW module may have a star schema or a snowflake schema, and the fact table locates in the center of the star schema or the snowflake schema.

In some embodiments, the foreign key of the fact table points to a primary key of the at least one dimension table. The primary key and a foreign key of the at least one dimension table point to different object elements in the business domain model.

In some embodiments, each dimension table may further include a hierarchy of the dimension, the hierarchy comprising a parent-child relationship or a multiple-level relationship.

In some embodiments, the fact table may further include a calculation method of the metric values.

In some embodiments, the calculation method includes one or more selected from an aggregation operation, an averaging operation, a minimizing operation, a maximizing operation, etc.

In some embodiments, the business domain model, the DW model and the mapping between the business domain model and the DW model may be designed by editing a natural expression language.

In some embodiments, before designing the business domain model, the DW model and the mapping therebetween synchronously, the method may further include: determining a syntax rule of the natural expression language which is contained in the predetermined syntax rule.

In another aspect, a system for designing a business domain model, a DW model and a mapping therebetween synchronously is provided, including:

a business domain model design unit, adapted to design a business domain model based on business logic;

a DW model design unit, adapted to design a DW model based on a structure of a data cube in a DW;

a mapping design unit, adapted to design a mapping between the business domain model and the DW model when the DW model is being designed;

an analysis unit, adapted to analyze the business domain model, the DW model and the mapping therebetween based on a predetermined syntax rule; and an automatic generation unit, adapted to automatically generate a transactional database corresponding to the business domain model, a DW database corresponding to the DW model, and a mapping between data in the transactional database and data in the DW database.

In some embodiments, the business domain model may include at least one object, each of the at least one object including at least one object element. The DW model may include one fact table and at least one dimension table. The fact table includes metric values and a foreign key which points to the at least one dimension table. Each of the at least one dimension table includes metadata of a dimension in the data cube. The mapping design unit may be adapted to design a mapping between metadata in the at least one dimension table and object elements in the at least one object.

In some embodiments, the foreign key of the fact table points to a primary key of the at least one dimension table. The primary key and a foreign key of the at least one dimension table point to different object elements in the business domain model.

The present disclosure may have following advantages. In embodiments of the present disclosure, a mapping between a business domain model and the DW model is designed when a DW model is being designed. A transactional database corresponding to the business domain model, a DW database corresponding to the DW model and a mapping between data in the transactional database and data in the DW database are generated automatically and synchronously based on an analysis. Therefore, a heavy workload caused by designing mappings manually may be saved, and mappings may be designed more easily, efficiently and accurately.

DETAILED DESCRIPTION OF THE DISCLOSURE

In order to clarify the objects, characteristics and advantages of the disclosure, embodiments will be described in the following description. It should be understood that, those skilled in the art can modify and change the embodiments without departing from the spirit and scope of the present disclosure.

Besides, embodiments of present disclosure will be described in detail in conjunction with accompanying drawings. It should be noted that, the accompanying drawings are only illustrative and do not limit the scope of the present disclosure.

Figure 1:
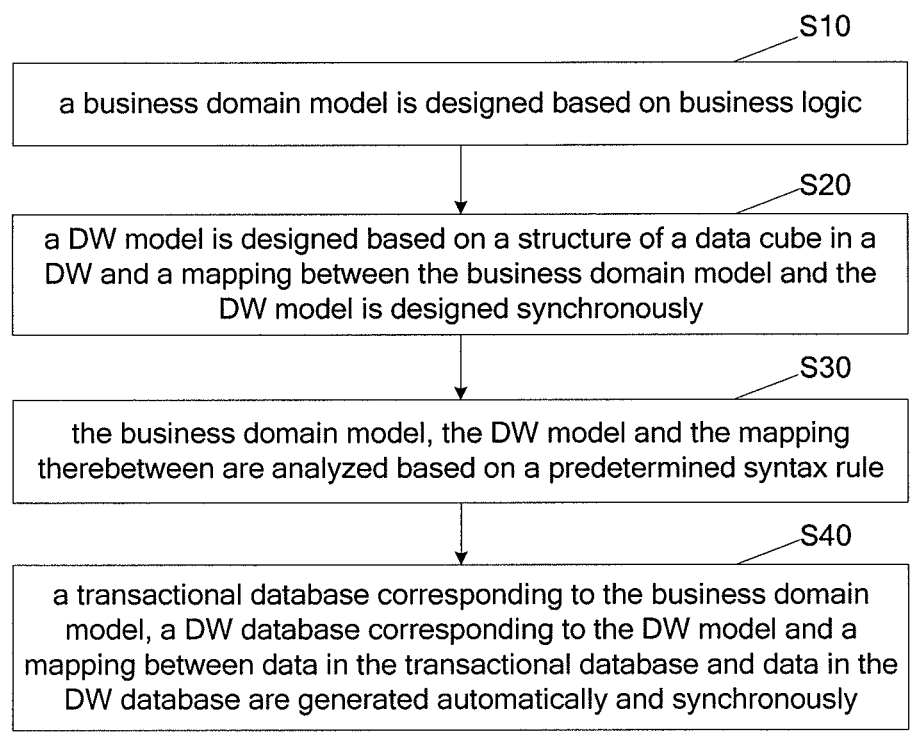
FIG. 1 schematically illustrates a flow chart of a method for designing a business domain model, a DW model and a mapping therebetween synchronously according to one embodiment of the present disclosure.

It is found that, technical problems in conventional solutions mainly result from an excessive separation between a design process for a transactional database and a design process for a DW database. Therefore, an embodiment of the present disclosure provides a method for designing a business domain model, a DW model and a mapping therebetween synchronously and automatically. FIG. 1 schematically illustrates a flow chart of a method for designing a business domain model, a DW model and a mapping therebetween synchronously according to one embodiment of the present disclosure. The method includes S10, S20, S30 and S40.

In S10, a business domain model is designed based on business logic. The business domain model includes at least one object, each of the at least one object including at least one object element.

Referring to FIG. 1, in S20, a DW model is designed based on a structure of a data cube in a DW and a mapping between the business domain model and the DW model is designed synchronously.

In some embodiments, the DW model may include one fact table and at least one dimension table. In some embodiments, the DW module may have a star schema or a snowflake schema, and the fact table locates in the center of the star schema or the snowflake schema.

In some embodiments, the fact table may include metric values and a foreign key which points to the at least one dimension table. In some embodiments, the at least one dimension table may further include a calculation method of the metric values, the calculation method including one or more selected from an aggregation operation, an averaging operation, a minimizing operation, a maximizing operation, etc.

In some embodiments, each dimension table may further include metadata of a dimension in the data cube. In some embodiments, each dimension table may further include a hierarchy of the dimension, the hierarchy including a parent-child relationship or a multiple-level relationship. The parent-child relationship includes two levels where one level is subordinate to the other. The multiple-level relationship includes multiple levels.

In some embodiments, designing a mapping between the business domain model and the DW model may include: the foreign key of the fact table pointing to a primary key of the at least one dimension table; and the primary key and a foreign key of the at least one dimension table pointing to different object elements in the business domain model. The foreign key of the fact table assembles metadata of the at least one dimension table into the fact table by quoting the primary key of the at least one dimension table.

In some embodiments, the business domain model, the DW model and the mapping between the business domain model and the DW model are designed synchronously by editing a National Expression Language (NEL). Those skilled in the art can understand, in other embodiments, other script languages may be used. In some embodiments, before designing the business domain model, the DW model and the mapping between the business domain model and the DW model synchronously, the method may further include: determining a syntax rule of the NEL.

Still referring to FIG. 1, in S30, the business domain model, the DW model and the mapping therebetween are analyzed based on a predetermined syntax rule. Since a NEL is used in the embodiment, the predetermined syntax rule is a syntax rule of the NEL.

Still referring to FIG. 1, in S40, a transactional database corresponding to the business domain model, a DW database corresponding to the DW model and a mapping between data in the transactional database and data in the DW database are generated automatically and synchronously.

It should be noted that, a data format of the transactional database and the DW database is not limited in embodiments of the present disclosure. In fact, those skilled in the art may select one existing data format, such as a data sheet in a relational database and XML, according to practical requirements.

Those skilled in the art can understand that, on the basis of the business domain model, the DW model and the mapping therebetween, the transactional database, the DW database and the mapping between data in the transactional database and data in the DW database may be generated automatically. To improve efficiency, a language conversion program may be prepared in advance to realize above-mentioned functions, such as converting a NEL to a data sheet in a relational database or converting a NEL to an XML file.

Figure 2:
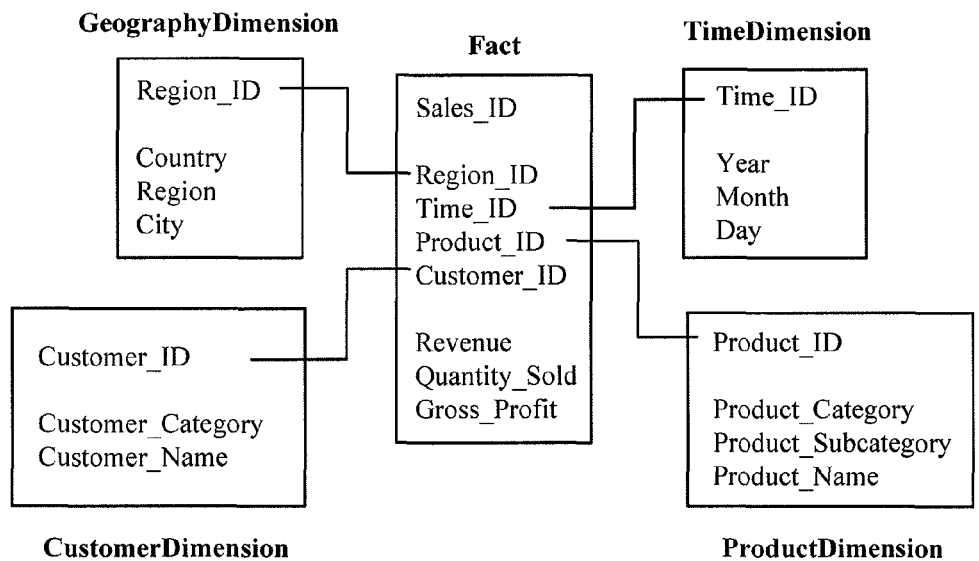
FIG. 2 schematically illustrates a structural diagram of a DW model according to one embodiment of the present disclosure.

In another embodiment, a method for designing a business domain model, a DW model and a mapping therebetween synchronously is provided. FIG. 2 illustrates a star schema of the DW model. As shown in FIG. 2, the DW model includes one fact table Fact and four dimension tables distributed in star. The four dimension tables include a geography dimension table GeographyDimension, a time dimension table TimeDimension, a customer dimension table CustomerDimension and a product dimension table ProductDimension. The fact table Fact locates in the center of the star schema, i.e., surrounded by the four dimension tables.

The fact table Fact further includes: one primary key, four foreign keys and three metric values. The primary key is Sales_ID, the four foreign keys include Region_ID, Time_ID, Product_ID and Customer_ID, and the metric values include Revenue, Quantity_Sold and Gross-Profit.

The geography dimension table GeographyDimension includes one primary key and three foreign keys. The primary key is Region_ID, and the three foreign keys include Country, Region and City.

The time dimension table TimeDimension includes one primary key and three foreign keys. The primary key is Time_ID, and the three foreign keys include Year, Month and Day.

The customer dimension table CustomerDimension includes one primary key and two foreign keys. The primary key is Customer_ID and the two foreign keys include Customer_Category and Customer_Name.

The product dimension table ProductDimension includes one primary key and three foreign keys. The primary key is Product_ID, and the three foreign keys include Product_Category, Product_SubCategory and Product_Name.

Further, there is a mapping between the foreign key Region_ID of the fact table Fact and the primary key Region_ID of the geography dimension table GeographyDimension; there is a mapping between the foreign key Time_ID of the fact table Fact and the primary key Time_ID of the time dimension table TimeDimension; there is a mapping between the foreign key Customer_ID of the fact table Fact and the primary key Customer_ID of the customer dimension table CustomerDimension; and there is a mapping between the foreign key Product_ID of the fact table Fact and the primary key Product_ID of the product dimension table ProductDimension.

In the embodiment, a program for designing the business domain model is illustrated as follows:

```
entity Geography {
    string RegionID
    string CountryID
    string Region
    string CityID
}
entity Product {
    string ProductID
    string ProductCategoryID
    string ProductSubcategoryID
    string ProductName
}
entity SalesRecord {
    string ProductID
    string RegionID
    decimal SalesAmount
    integer Quantity
    decimal GrossProfit
}.
```

It should be noted that, in the embodiment, the business domain model includes five objects, a geography object Geography, a product object Product, a sale product SalesRecord, a time object Time and a customer object Customer. For brief, only the program for creating the objects Geography, Product, SalesRecord is specifically illustrated, while the program for creating the objects Time and Customer is omitted.

In some embodiments, the geography object Geography includes four object elements, character region identification RegionID, character country identification CountryID, character region identification Region, and character city identification CityID.

In some embodiments, the product object Product includes four object elements, character product identification ProductID, character product category identification ProductCategoryID, character product subcategory identification ProductSubcategoryID, and character product name identification ProductName.

In some embodiments, the sale object SalesRecord includes five object elements, character product category identification ProductCategoryID, character region identification RegionID, float sales amount SalesAmount, integer quantity Quantity and float gross fit GrossProfit.

In the embodiment, a program for designing the dimension tables, the fact table and the mapping between the DW model and the business domain model synchronously is illustrated as follows:

```
dimension ProductDimension {
    attribute primarykey Product_ID Product.ProductID
    attribute Product_Category Product.ProductCategoryID
    attribute Product_Subcategory Product.ProductSubcategoryID
    attribute Product_Name Product.ProductName
    valuehierarchyProduct_Category, Product_Subcategory
    /*value based (parent-child) hierarchy*/
}
dimension GeographyDimension {
    attribute primarykey Region_ID Geography.RegionID
    attribute Country Geography.CountryID
    attribute Region Geography.Region
    attribute City Geography.CityID
```

-continued

```
  levelhierarchy Country, Region, City   /*level based hierarchy*/
}
fact Fact {
  attribute Sales_ID
  attribute Region_ID refers GeographyDimension.Region_ID
  attribute Customer_ID refers CustomerDimension.Customer_ID
  attribute Product_ID refers ProductDimension.Product_ID
  attribute Time_ID refers TimeDimension.Time_ID
  measure integer Revenue SalesRecord.SalesAmount aggregation Sum
  /*Sum is the aggregation function, it can be Sum, Avg, Min, Max...*/
  measure integer Quantity_Sold SalesRecord.Quantity aggregation Sum
  measure integer Gross_profit SalesRecord.GrossProfit aggregation Sum
}.
```

It should be noted that, in the embodiment, the DW model includes four dimension tables, a product dimension table ProductDimension, a geography dimension table GeographyDimension, a time dimension table TimeDimension and a customer object CustomerDimension. For brevity, a program for designing the time dimension table TimeDimension and the customer dimension table CustomerDimension is omitted.

In some embodiments, the primary key Product_ID of the product dimension table ProductDimension quotes data of the object element ProductID in the product object Product in the business domain model. The foreign key Product_Category of the product dimension table ProductDimension quotes data of the object element ProductCategoryID in the product object Product in the business domain model. The foreign key Product_Subcategory of the product dimension table ProductDimension quotes data of the object element ProductSubcategoryID in the product object Product in the business domain model. The foreign key Product_Name of the product dimension table ProductDimension quotes data of the object element ProductName in the product object Product in the business domain model.

In the embodiment, during designing the product dimension table ProductDimension, a hierarchy between the foreign keys Product_Category and Product_Subcategory is defined as a parent-child relationship, where the foreign key Product_Category is a parent and the foreign key Product_Subcategory is a child.

In some embodiments, the primary key Region_ID of the geography dimension table GeographyDimension quotes data of the object element RegionID in the geography object Geography in the business domain model. The foreign key Country of the geography dimension table GeographyDimension quotes data of the object element CountryID in the geography object Geography in the business domain model. The foreign key Region of the geography dimension table GeographyDimension quotes data of the object element Region in the geography object Geography in the business domain model. The foreign key City of the geography dimension table GeographyDimension quotes data of the object element CityID in the geography object Geography in the business domain model.

In the embodiment, during designing the geography dimension table GeographyDimension, a hierarchy between the foreign keys Country, Region and City is defined as a multi-level relationship, where the foreign key Country is a top level, the foreign key Region is a central level and the foreign key City is a bottom level.

The DW model further includes a fact table Fact. The primary key of the fact table Fact is Sales_ID. The foreign key Region_ID in the fact table Fact quotes data of the primary key Region_ID in the geography dimension table GeographyDimension; the foreign key Customer_ID in the fact table Fact quotes data of the primary key Customer_ID in the customer dimension table CustomerDimension; the foreign key Product_ID in the fact table Fact quotes data of the primary key Product_ID in the product dimension table ProductDimension; and the foreign key Time_ID in the fact table Fact quotes data of the primary key Time_ID in the time dimension table TimeDimension.

In the fact table Fact, the integer metric value Revenue is a sum of the object element SalesAmount in the sale object SalesRecord in the business domain model; the integer metric value Quantity_Sold is a sum of the object element Quantity in the sale object SalesRecord in the business domain model; and the integer metric value Gross_profit is a sum of the object element GrossProfit in the sale object SalesRecord in the business domain model.

In some embodiments, the method may further include: analyzing the business domain model, the DW model and the mapping therebetween based on a predetermined syntax rule; and generating a transactional database corresponding to the business domain model, a DW database corresponding to the DW model, and a mapping between data in the transactional database and data in the DW database automatically and synchronously. A data format of the transactional database and the DW database is not limited in embodiments of the present disclosure.

Those skilled in the art may know that, parts or all of the present disclosure may be implemented based on a combination of software and a general hardware platform according to above description of embodiments. Therefore, embodiments of the present disclosure may be accomplished in a computer software product substantially. The computer software product may include at least one computer readable medium which has computer executable instructions stored therein. When the executable instructions are implemented by at least one device selected from a computer, a computer network and other electronic devices, the at least one device can implement operations according to embodiments of the present disclosure. The computer readable medium may include but not be limited to floppy disk, optical disk, Compact Disc-Read Only Memory (CD-ROM), magneto-optical disc, Read-Only Memory (ROM), Random-Access Memory (RAM), Erasable Programmable Read-Only Memory (EPROM), Electrically Erasable Programmable Read-only memory (EEPROM), magnetic card, optical card, flash or any other medium/computer readable medium which is adapted to store computer executable instructions.

Embodiments of the present disclosure may be implemented in a plurality of general or special computer system environment or devices, such as a personal computer (PC), a sever computer, a handheld device, a portable device, a pad, a multi-processor system, a system based on microprocessor, a set-top box, a programmable consumer electronic device, a network PC, a mini computer, a mainframe computer and a distributed computing environment containing any of the above systems or devices.

Embodiments of the present disclosure may be realized by a context including executable instructions which can be implemented by a computer, such as a program module. Generally, a program module includes routines, programs, objects, components and data structures which can implement particular tasks or realize particular abstract data categories. Embodiments of the present disclosure may be implemented in a distributed computing environment, where tasks may be implemented by remote processing devices which are coupled in a communication network. In the distributed computing environment, program modules may be located in local and remote computer storing mediums, such as a memory.

Figure 3:
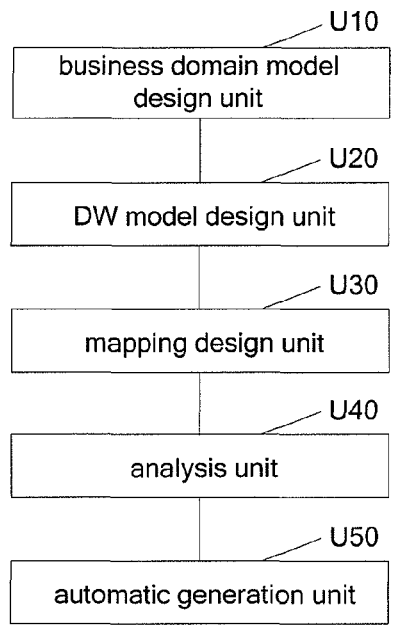
FIG. 3 schematically illustrates a block diagram of a system for designing a business domain model, a DW model and a mapping therebetween synchronously according to one embodiment of the present disclosure.

Accordingly, in one embodiment, a system for designing a business domain model, a DW model and a mapping therebetween synchronously is provided. FIG. 3 schematically illustrates a block diagram of a system for designing a business domain model, a DW model and a mapping therebetween synchronously according to one embodiment of the present disclosure. As shown in FIG. 3, the system includes a business domain model design unit U10, a DW model design unit U20, a mapping design unit U30, an analysis unit U40 and an automatic generation unit U50.

The business domain model design unit U10 is adapted to design a business domain model based on business logic. The business domain model may include at least one object, each of the at least one object including at least one object element.

The DW model design unit U20 is connected with the business domain model design unit U10 and adapted to design a DW model based on a structure of a data cube in a DW.

In some embodiments, the DW model may include one fact table and at least one dimension table. In some embodiments, the at least one dimension table may have a star schema or a snowflake schema, and the fact table locates in the center of the star schema or the snowflake schema.

In some embodiments, the fact table may include metric values and a foreign key which points to the at least one dimension table. In some embodiments, the fact table may further include a calculation method of the metric values, the calculation method including one or more selected from an aggregation operation, an averaging operation, a minimizing operation, a maximizing operation, etc.

In some embodiments, each dimension table may include metadata of a dimension in the data cube. In some embodiments, each dimension table may further include a hierarchy of the dimension, the hierarchy including a parent-child relationship or a multiple-level relationship. The parent-child relationship includes two levels where one level is subordinate to the other. The multiple-level relationship includes multiple levels.

The mapping design unit U30 is connected with the DW model design unit U20 and adapted to design a mapping between the business domain model and the DW model when the DW model is being designed. The foreign key of the fact table points to a primary key of the at least one dimension table. The primary key and a foreign key of the at least one dimension table point to different object elements in the business domain model.

The analysis unit U40 is connected with the mapping design unit U30 and adapted to analyze the business domain model, the DW model and the mapping therebetween based on a predetermined syntax rule.

The automatic generation unit U50 is connected with the analysis unit U40, and adapted to automatically generate a transactional database corresponding to the business domain model, a DW database corresponding to the DW model and a mapping between data in the transactional database and data in the DW database.

It should be noted that, those skilled in the art may understand that parts of above-mentioned components may be a programmable logic device including at least one selected from Programmable Array Logic (PAL), Generic Array Logic (GAL), Field-Programmable Gate Array (FPGA) and Complex Programmable Logic Device (CPLD), which is not limited in embodiments of the present disclosure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for designing a business domain model, a data warehouse model and a mapping therebetween synchronously, comprising:
designing a business domain model based on business logic;
designing a data warehouse model based on a structure of a data cube in a data warehouse and designing a mapping relation between the business domain model and the data warehouse model synchronously;
analyzing the business domain model, the data warehouse model and the mapping therebetween based on a predetermined syntax rule; and
generating a transactional database corresponding to the business domain model, a data warehouse database corresponding to the data warehouse model, and a mapping between data in the transactional database and data in the data warehouse database automatically and synchronously,
wherein the business domain model comprises at least one object, each of the at least one object comprising at least one object element; the data warehouse model comprises one fact table and at least one dimension table; the fact table comprises metric values and a foreign key which points to the at least one dimension table; each of the at least one dimension table comprises metadata of a dimension in the data cube; and designing a mapping relation between the business domain model and the data warehouse model synchronously comprises designing a mapping between metadata in the at least one dimension table and object elements in the at least one object.

2. The method according to claim 1, wherein the data warehouse module has a star schema or a snowflake schema, and the fact table locates in the center of the star schema or the snowflake schema.

3. The method according to claim 1, wherein the foreign key of the fact table points to a primary key of the at least one dimension table, and the primary key and a foreign key of the at least one dimension table point to different object elements in the business domain model.

4. The method according to claim 1, wherein each of the at least one dimension table further comprises a hierarchy of the dimension, the hierarchy comprising a parent-child relationship or a multiple-level relationship.

5. The method according to claim 1, wherein the fact table further comprises a calculation method of the metric values.

6. The method according to claim 5, wherein the calculation method comprises one or more selected from an aggregation operation, an averaging operation, a minimizing operation and a maximizing operation.

7. The method according to claim 1, wherein the business domain model, the data warehouse model and the mapping between the business domain model and the data warehouse model are designed by editing a natural expression language.

8. The method according to claim 7, wherein before designing the business domain model, the data warehouse model and the mapping therebetween synchronously, the method further comprises: determining a syntax rule of the natural expression language which is contained in the predetermined syntax rule.

9. A system for designing a business domain model, a data warehouse model and a mapping therebetween synchronously, comprising:
- a business domain model design unit, adapted to design a business domain model based on business logic;
- a data warehouse model design unit, adapted to design a data warehouse model based on a structure of a data cube in a data warehouse;
- a mapping design unit, adapted to design a mapping between the business domain model and the data warehouse model when the data warehouse model is being designed;
- an analysis unit, adapted to analyze the business domain model, the data warehouse model and the mapping therebetween based on a predetermined syntax rule; and
- an automatic generation unit, adapted to automatically generate a transactional database corresponding to the business domain model, a data warehouse database corresponding to the data warehouse model and a mapping between data in the transactional database and data in the data warehouse database,
- wherein the business domain model comprises at least one object, each of the at least one object comprising at least one object element; the data warehouse model comprises one fact table and at least one dimension table; the fact table comprises metric values and a foreign key which points to the at least one dimension table; each of the at least one dimension table comprises metadata of a dimension in the data cube; and the mapping design unit is adapted to design a mapping between metadata in the at least one dimension table and object elements in the at least one object.

10. The system according to claim 9, wherein the foreign key of the fact table points to a primary key of the at least one dimension table; and the primary key and a foreign key of the at least one dimension table point to different object elements in the business domain model.

* * * * *